(12) United States Patent
Chappell et al.

(10) Patent No.: US 11,921,917 B2
(45) Date of Patent: Mar. 5, 2024

(54) COMPACT EYE-TRACKING CAMERA SYSTEMS AND METHODS

(71) Applicant: EyeTech Digital Systems, Inc., Mesa, AZ (US)

(72) Inventors: Robert C. Chappell, Mesa, AZ (US); Bryson C Hinton, Mesa, AZ (US); Michael S Holford, Gilbert, AZ (US)

(73) Assignee: EYETECH DIGITAL SYSTEMS, INC., Mesa, AZ (US)

( * ) Notice: Subject to any disclaimer, the term of this patent is extended or adjusted under 35 U.S.C. 154(b) by 0 days.

(21) Appl. No.: 16/842,322

(22) Filed: Apr. 7, 2020

(65) Prior Publication Data

US 2021/0311549 A1 Oct. 7, 2021

(51) Int. Cl.
*G06F 3/01* (2006.01)
*H04N 23/54* (2023.01)
*H04N 23/55* (2023.01)

(52) U.S. Cl.
CPC .............. *G06F 3/013* (2013.01); *H04N 23/54* (2023.01); *H04N 23/55* (2023.01)

(58) Field of Classification Search
CPC ..... G06F 3/013; H04N 5/2253; H04N 5/2254
See application file for complete search history.

(56) References Cited

U.S. PATENT DOCUMENTS

| | | | |
|---|---|---|---|
| 5,367,315 A | 11/1994 | Pan | |
| 7,572,008 B2 | 8/2009 | Elvesjo | |
| 8,350,889 B1 | 1/2013 | Shammoh | |
| 9,106,819 B1* | 8/2015 | Gao | H04N 5/2257 |
| 9,185,352 B1 | 11/2015 | Jacques | |
| 9,612,656 B2 | 4/2017 | Sztuk et al. | |
| 10,061,383 B1 | 8/2018 | Ludusan | |
| 10,157,313 B1 | 12/2018 | Zhang et al. | |
| 10,373,992 B1* | 8/2019 | Hsu | G02B 7/025 |
| 10,402,649 B2 | 9/2019 | Rabinovich et al. | |
| 10,521,661 B2 | 12/2019 | Chen et al. | |
| 10,636,158 B1 | 4/2020 | Kamiyama et al. | |
| 2013/0293488 A1 | 11/2013 | Na et al. | |
| 2014/0168056 A1 | 6/2014 | Swaminathan et al. | |
| 2014/0225131 A1 | 8/2014 | Benson et al. | |
| 2015/0160726 A1 | 6/2015 | Sullivan | |

(Continued)

OTHER PUBLICATIONS

Xuan Li et al, "An Efficient Robust Eye Localization by Learning the Convolution Distribution Using Eye Template", Computional Intelligence and Neuroscience, Oct. 2015, vol. 2015, 21pgs.

(Continued)

*Primary Examiner* — Richard T Torrente
(74) *Attorney, Agent, or Firm* — Quarles & Brady LLP

(57) ABSTRACT

Systems and methods are provided for a compact eye-tracking camera assembly. The camera incorporates a lens and image sensor whose principal axis is parallel to the plane of the display surface, and a compound angle mirror configured to redirect incident IR light along the principal axis. The compound angle mirror has a first angle of approximately 45 degrees relative to a first axis, and a second angle of approximately 15-22 degrees (e.g., 18 degrees) relative to a second axis that is orthogonal to the first axis. The first and second axes are substantially parallel to the plane of the display surface.

14 Claims, 5 Drawing Sheets

(56) References Cited

U.S. PATENT DOCUMENTS

| | | | |
|---|---|---|---|
| 2015/0223684 A1* | 8/2015 | Hinton | A61B 3/113 |
| | | | 351/210 |
| 2015/0227735 A1 | 8/2015 | Chappell | |
| 2016/0106315 A1 | 4/2016 | Kempinski | |
| 2016/0262685 A1 | 9/2016 | Wagner et al. | |
| 2016/0270655 A1 | 9/2016 | Caraffi et al. | |
| 2017/0068287 A1 | 3/2017 | Jung et al. | |
| 2017/0140224 A1* | 5/2017 | Wilson | H04N 5/247 |
| 2017/0188823 A1 | 7/2017 | Ganesan et al. | |
| 2017/0285741 A1 | 10/2017 | Park et al. | |
| 2018/0089834 A1 | 3/2018 | Spizheroy et al. | |
| 2018/0181809 A1 | 6/2018 | Ranjan et al. | |
| 2018/0307270 A1 | 10/2018 | Pantel | |
| 2019/0087973 A1 | 3/2019 | Kaehler et al. | |
| 2019/0102905 A1 | 4/2019 | Skogo | |
| 2019/0204585 A1* | 7/2019 | Coffin | G02B 26/101 |
| 2019/0302973 A1 | 10/2019 | Engelke et al. | |
| 2019/0303724 A1 | 10/2019 | Linden | |
| 2019/0317597 A1 | 10/2019 | Aleem et al. | |
| 2019/0324532 A1 | 10/2019 | Aleem et al. | |
| 2020/0099835 A1* | 3/2020 | Chang | H01L 27/14689 |
| 2020/0104589 A1 | 4/2020 | Senegelaub et al. | |
| 2020/0110271 A1 | 4/2020 | Komogortser et al. | |
| 2020/0134868 A1 | 4/2020 | Liu et al. | |
| 2020/0143189 A1 | 5/2020 | Shiota et al. | |
| 2020/0153768 A1 | 5/2020 | Cohen | |
| 2020/0193206 A1 | 6/2020 | Turkelson et al. | |

OTHER PUBLICATIONS

International Search Report; PCT/US/21/25997; dated Jun. 30, 2021; 3 pgs.

Written Opinion; PCT/US21/25997; dated Jun. 30, 2021; 4 pgs.

International Preliminary Report on Patentability, PCT/US2020/045149, dated Feb. 17, 2022, 5pgs.

U.S. Appl. No. 16/434,830, filed Jun. 7, 2019; Robert C. Chappell et al. "Devices and Methods for Reducing Computational and Transmission Latencies in Cloud Base Eye Tracking Systems".

* cited by examiner

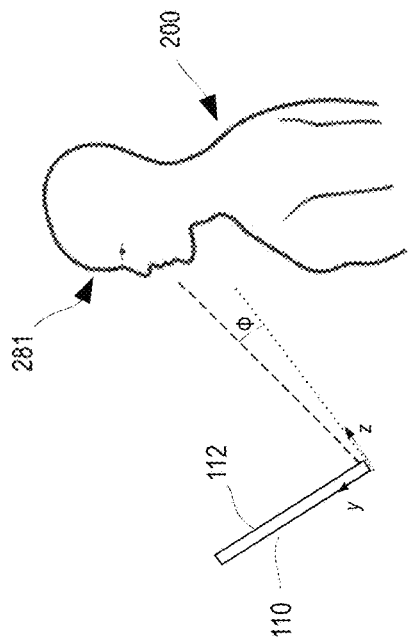
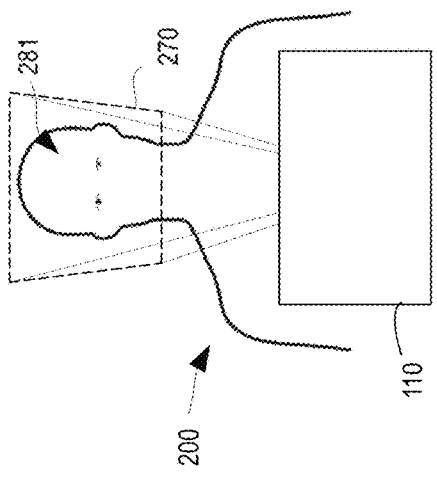
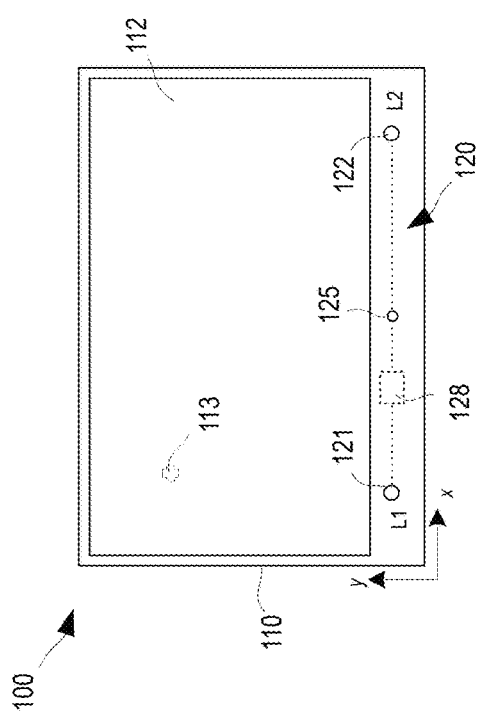
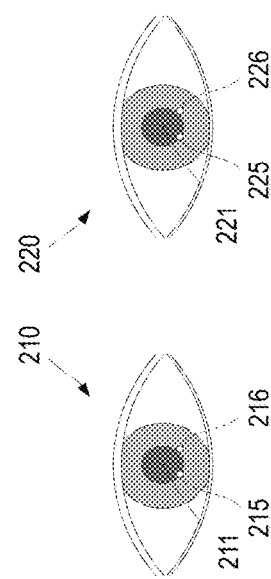
FIG. 2A
FIG. 2B
FIG. 1
FIG. 2C

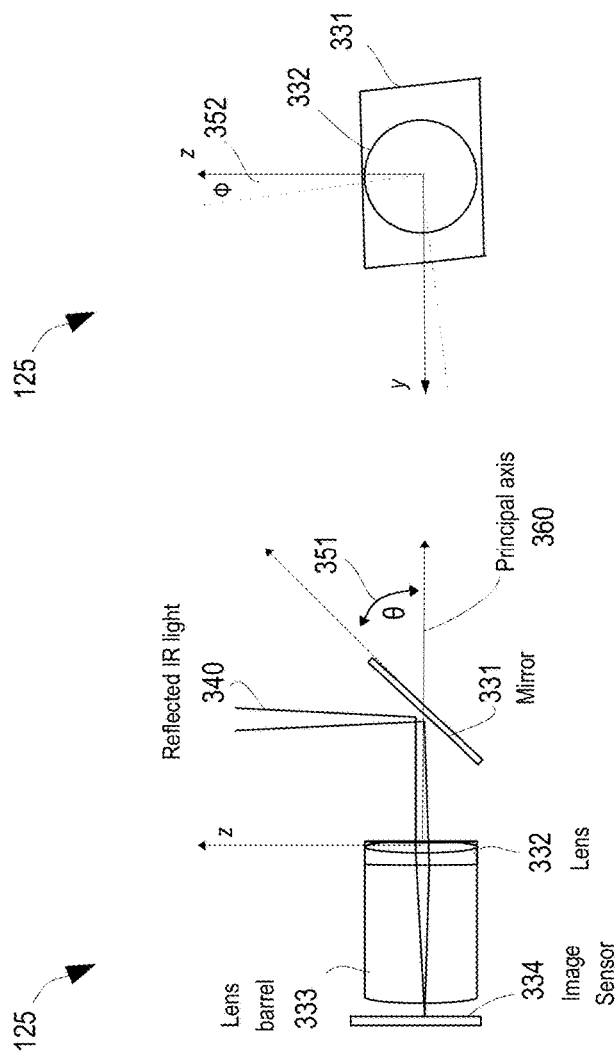
FIG. 3A
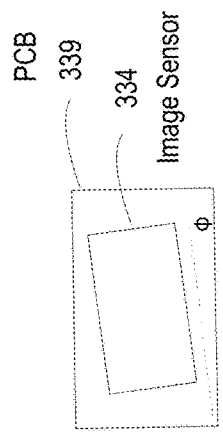
FIG. 3B
FIG. 3C

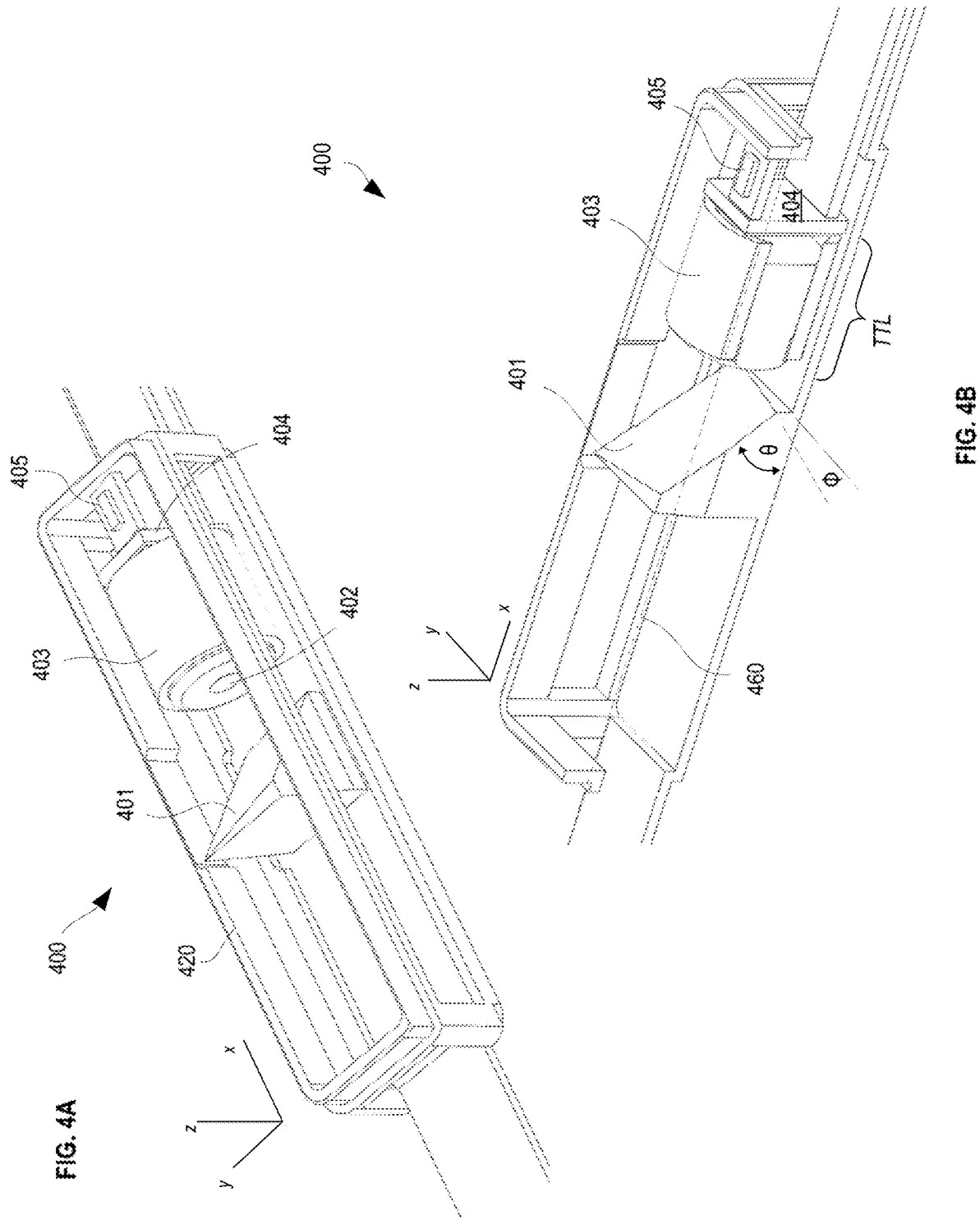

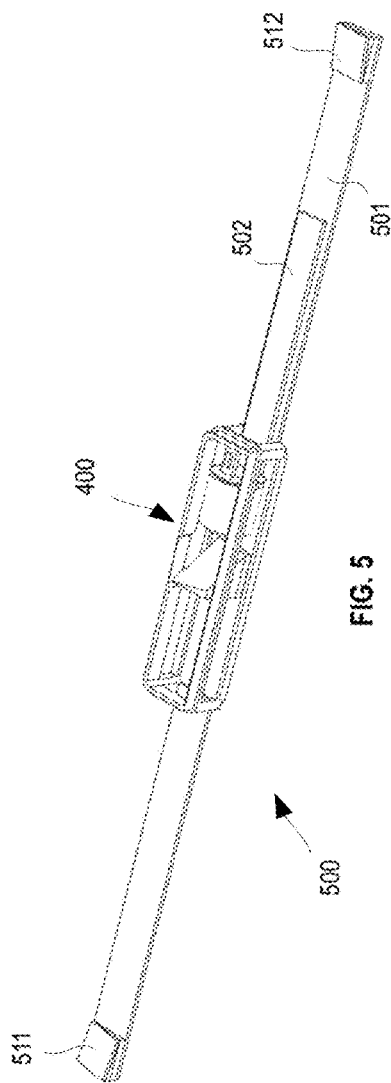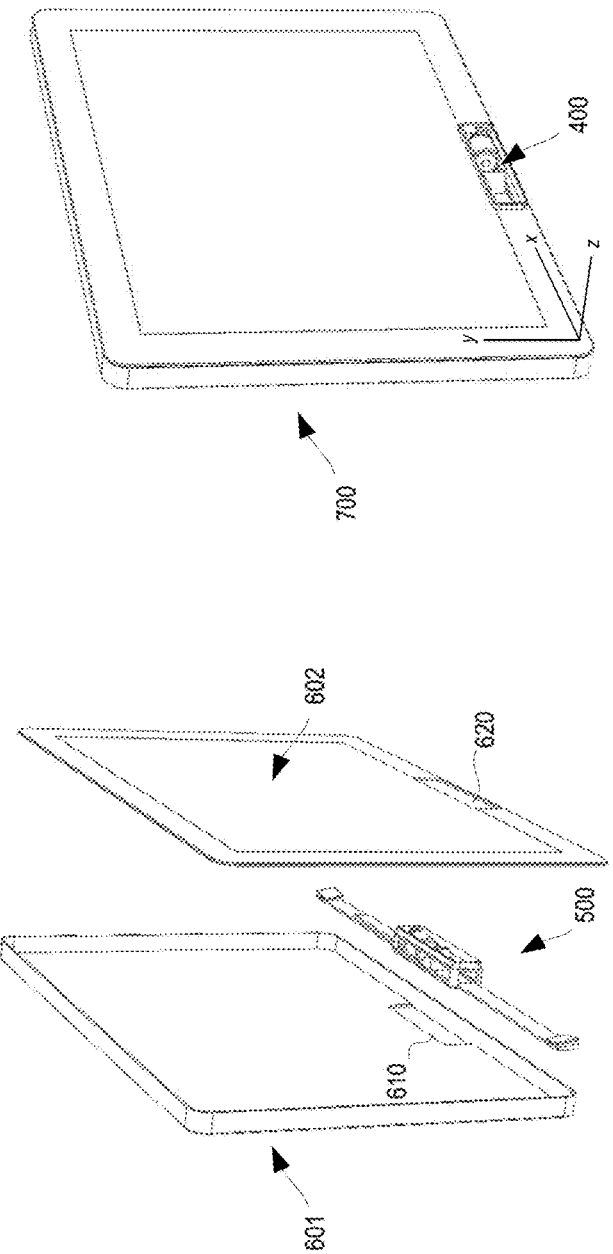

COMPACT EYE-TRACKING CAMERA SYSTEMS AND METHODS

TECHNICAL FIELD

The present invention relates, generally, to eye-tracking systems and methods and, more particularly, to compact camera assemblies used in connection with such eye-tracking systems.

BACKGROUND

Eye-tracking systems, such as those used in conjunction with desktop computers, laptops, tablets, head-mounted displays and other such computing devices that include a display, generally incorporate one or more illuminators for directing infrared light to the user's eyes, and a camera assembly (including a lens and image sensor) for capturing reflected images of the user's face for further processing. By determining the relative locations of the user's pupils and the corneal reflections in the reflected images, the eye-tracking system can accurately predict the user's gaze point on the display.

Recent advances in display technology as well as consumer demand for lightweight devices have driven a trend toward very thin displays, particularly in laptop computers and tablets. Indeed, some modern laptop displays have a thickness of 15 mm or less. This presents a challenge when attempting to incorporate eye-tracking functionality in such devices, as the lenses and cameras used for eye-tracking generally have an irreducible minimum focal length, sometimes on the order of 15 mm or more. While it is possible for lens/camera assemblies to be configured such that they extend out of the front surface bezel, such non-flush configurations are generally undesirable for a variety of design and manufacturability reasons. Systems and methods are therefore needed that overcome these and other limitations of the prior art.

SUMMARY OF THE INVENTION

Various embodiments of the present invention relate to systems and methods for, inter alia: i) a compact, laterally-mounted lens and image sensor that receive incident IR light via a compound mirror generally oriented toward a user's face while interacting with a display; i) a compact eye-tracking camera assembly incorporating a lens and image sensor whose principal axis is parallel to the plane of the display surface, and a compound angle mirror configured to redirect incident IR light along the principal axis; ii) the use of a compound angle mirror that has a first angle of approximately 45 degrees relative to a first axis, and a second angle of approximately 15-22 degrees (e.g., 18 degrees) relative to a second axis that is orthogonal to the first axis, wherein the first and second axes are substantially parallel to the plane of the display surface.

BRIEF DESCRIPTION OF THE DRAWING FIGURES

The present invention will hereinafter be described in conjunction with the appended drawing figures, wherein like numerals denote like elements, and:

FIG. 1 is a conceptual overview of a computing device and eye-tracking system in accordance with various embodiments;

FIGS. 2A and 2B are front and side views, respectively, of a user interacting with an eye-tracking system in accordance with various embodiments;

FIG. 2C illustrates the determination of pupil centers (PCs) and corneal reflections (CRs) in accordance with various embodiments;

Figure 8:
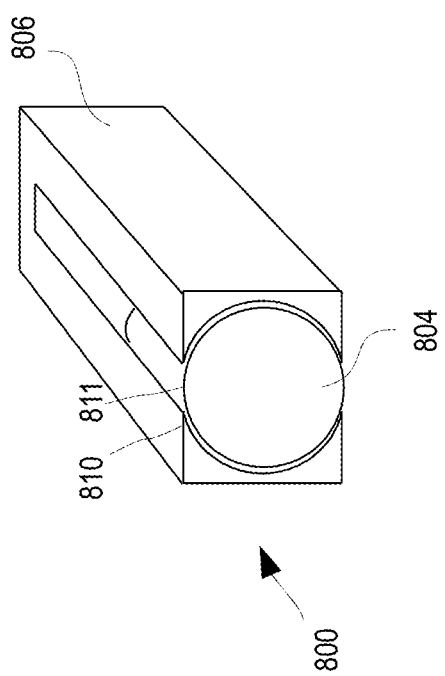

FIGS. 3A, 3B, and 3C are schematic diagrams of camera assembly geometry in accordance with various embodiments;

FIG. 4A is an isometric overview of a camera assembly in accordance with one embodiment;

FIG. 4B is an alternate, partial cut-away view of the camera assembly of FIG. 4A;

FIG. 5 is an isometric overview of an eye-tracking assembly in accordance with one embodiment;

FIGS. 6 and 7 illustrate the incorporation of the eye-tracking assembly of FIG. 5 into a finished computing device in accordance with one embodiment; and FIG. 8 illustrates a compact lens enclosure structure in accordance with one embodiment.

DETAILED DESCRIPTION OF PREFERRED EXEMPLARY EMBODIMENTS

The present subject matter relates to systems and methods for a compact, laterally-mounted lens and image sensor that receive IR light via a compound mirror. Since the effective width (e.g., diameter) of such components are generally less than the overall length necessitated by the lens focal length, by mounting the lens and image sensor parallel to the display (rather than orthogonal) and using compound mirror to collect the incident IR light, the camera assembly can be incorporated into much thinner displays.

As a preliminary matter, it will be understood that the following detailed description is merely exemplary in nature and is not intended to limit the inventions or the application and uses of the inventions described herein. Furthermore, there is no intention to be bound by any theory presented in the preceding background or the following detailed description. In the interest of brevity, conventional techniques and components related to eye-tracking algorithms, image sensors, lens design, and digital image processing may not be described in detail herein.

Referring first to FIG. 1 in conjunction with FIGS. 2A-2C, the present invention may be implemented in the context of a system 100 that includes a computing device 110 (e.g., a desktop computer, tablet computer, laptop, smart-phone, head-mounted display, television panels, dashboard-mounted automotive systems, or the like) having a display 112 and an eye-tracking assembly 120 coupled to, integrated into, or otherwise associated with device 110. It will be appreciated that embodiments of the present invention are not limited to the particular shape, size, and type of computing devices 110 illustrated in the figures.

Eye-tracking assembly 120 includes one or more infrared (IR) light sources, such as light emitting diodes (LEDs) 121 and 122 (alternatively referred to as "L1" and "L2" respectively) that are configured to illuminate the facial region 281 of a user 200, while one or more camera assemblies (e.g., camera assembly 125) are provided for acquiring, at a suitable frame-rate, reflected IR light from user's facial region 281 within a field-of-view 270. Eye-tracking assembly may include one or more processors (e.g., processor 128) configured to direct the operation of LEDs 121, 122 and camera assembly 125. Eye-tracking assembly 120 is preferably positioned adjacent to the lower edge of screen 112 (relative to the orientation of device 110 as used during normal operation).

System 100, utilizing computing device 110 (and/or a remote cloud-based image processing system) then determines the pupil centers (PCs) and corneal reflections (CRs) for each eye—e.g., PC 211 and CRs 215, 216 for the user's right eye 210, and PC 221 and CRs 225, 226 for the user's left eye 220. The system 100 then processes the PC and CR data (the "image data"), as well as available information regarding the head position/orientation for user 200, and determines the location of the user's gaze point 113 on display 112. The gaze point 113 may be characterized, for example, by a tuple (x, y) specifying linear coordinates (in pixels, centimeters, or other suitable unit) relative to an arbitrary reference point on display screen 112. The determination of gaze point 113 may be accomplished in a variety of ways, e.g., through the use of eye-in-head rotations and head-in-world coordinates to geometrically derive a gaze vector and its intersection with display 112, as is known in the art.

In general, the phrase "eye-tracking data" as used herein refers to any data or information directly or indirectly derived from an eye-tracking session using system 100. Such data includes, for example, the stream of images produced from the users' facial region 281 during an eye-tracking session ("image data"), as well as any numeric and/or categorical data derived from the image data, such as gaze point coordinates, corneal reflection and pupil center data, saccade (and micro-saccade) information, and non-image frame data. More generally, such data might be include information regarding fixations (phases when the eyes are stationary between movements), saccades (rapid and involuntary eye movements that occur between fixations) scan-path (series of short fixations and saccades alternating before the eyes reach a target location on the screen), duration (sum of all fixations made in an area of interest), blink (quick, temporary closing of eyelids), and pupil size (which might correlate to cognitive workload, etc.).

In some embodiments, image data may be processed locally (i.e., within computing device 110 and/or processor 128) using an installed software client. In some embodiments, however, eye tracking is accomplished using an image processing module remote from computing device 110—e.g., hosted within a cloud computing system communicatively coupled to computing device 110 over a network (not shown). In such embodiments, the remote image processing module performs all or a portion of the computationally complex operations necessary to determine the gaze point 113, and the resulting information is transmitted back over the network to computing device 110. An example cloud-based eye-tracking system that may be employed in the context of the present invention is illustrated in U.S. patent application Ser. No. 16/434,830, entitled "Devices and Methods for Reducing Computational and Transmission Latencies in Cloud Based Eye Tracking Systems," filed Jun. 7, 2019, the contents of which are hereby incorporated by reference.

Referring now to the conceptual block diagrams of FIGS. 3A and 3B, the geometry of an exemplary camera assembly 125 will now be described. More particularly, FIG. 3A is a side view of assembly 125, and FIG. 3B is a head-on view of assembly 125. The coordinate axes illustrated in FIGS. 3A and 3B correspond to those in FIGS. 1 and 2B. The z-axis generally extends outward from the plane defined by display 112, and may therefore be referred to as the normal vector of display 112. The x and y-axes both lie in a plane parallel to display 112, wherein the x-axis is parallel to the major axis of eye-tracking assembly 120 (defined by a line extending through IR LEDs 121 and 122), and the y-axis is perpendicular to the x-axis.

With continued reference to FIG. 3A, incident IR light 340 (i.e., reflected from the user's face) is reflected by a mirror 331 (e.g., an IR mirror or "hot mirror") onto an image sensor (e.g., a CMOS sensor) 334 via a lens 332 with a suitable focal length. Lens 332 may be supported by a lens barrel (or other such housing) 333. The centers of image sensor 334, lens barrel 333, lens 332, and mirror 331 are generally colinear along a principal axis 360, as shown. Thus, assembly 125 is laterally or "sideways-mounted" in the sense that the principal axis 360 lies within a plane parallel to the plane of display 112, rather than orthogonal (parallel to the surface normal) as would traditionally be the case. In the illustrated embodiment, the principal axis 360 is parallel to the x-axis (i.e., parallel to the lower edge of display 112, as depicted in FIG. 1).

As shown in FIG. 3A, mirror 331 is oriented at an angle 351 relative to the x-axis—i.e., rotated about the y-axis by an angle $\theta$—wherein $\theta$ is substantially equal to 45 degrees (e.g., 45°±2°). At the same time, as shown in FIG. 3B, mirror 331 is oriented at an angle 352 relative to the z-axis by an angle $\Phi$—wherein $\Phi$ is in the range of 15-20 degrees (e.g., 18°±1°).

Stated more intuitively, mirror 331 is positioned at a compound angle that results in camera assembly 125 facing the user at a slightly upward angle $\Phi$. This is illustrated, for example, in FIG. 2B. Thus, the 45-degree angle compensates for the camera assembly being mounted laterally (along the x-axis), and the 15-20 degree angle accounts for the usual position and orientation of a user's face during normal operation of device 110.

In one embodiment, the diameter of lens 332 and/or lens barrel 333 ranges from 8 to 12 mm (e.g., 10 mm), and required total track length (i.e., distance along the x-axis from the rightmost surface of lens 332 to the surface of image sensor 334 ranges from 12 to 20 mm (e.g., 15 mm). In such an embodiment, the resulting thickness required for device 110 to accommodate camera assembly 125 is reduced by up to 50%. In one embodiment, as shown in FIG. 3C, the image sensor 334 is also rotated about the x-axis (and mounted to a PCB 339) to compensate for the rotation of mirror 331.

FIG. 4A is an isometric overview of a camera assembly in accordance with one embodiment, and FIG. 4B is an alternate, partial cut-away view of the same embodiment. Camera assembly 400 includes a housing 420, a compound angle mirror 401, a lens 402, a lens barrel 403, and an image sensor 404—all of which are substantially colinear along a principal axis 460. Assembly 400 might also include other sensors, such as a distance sensor 405 facing outward (i.e., the positive z axis). As depicted in FIG. 4B, mirror 401 has an orientation characterized by orthogonal angles $\Phi$ and $\theta$. The track length d extends along the x-axis from the leftmost edge of lens 402 to the surface of image sensor 404.

FIG. 5 is an isometric overview of an assembly 500 that includes a camera assembly as depicted in FIG. 4. That is, camera assembly 400 is positioned at the midpoint of a substrate (e.g., a plastic strip) 501. Antipodal printed circuit boards (PCBs) 511 and 512 are secured to the endpoints of substrate 501 (at a slight inward-facing and upward-facing angle, as shown) and are configured to mechanically and electrically interface with a pair of IR LEDs (e.g., IR LEDs 121 and 122 in FIG. 1). A circuit board 502 may also be provided to support the various controllers, image processor chips, and other electronics used to control the components of camera assembly 400 and PCBs 511, 512.

FIGS. 6 and 7 illustrate the incorporation of the eye-tracking assembly of FIG. 5 into a finished computing device 700 in accordance with one embodiment. As shown, assembly 500 is positioned between a back enclosure 601 and a display screen component 602 that are configured to be secured together such that module the camera module 400 is framed by an opening 620 in component 602 (allowing a clear view of the user). A rear portion of module 400 may also be configured to fit within an opening 610 in back enclosure 601 such that module 400 is substantially flush therewith. While not illustrated in FIGS. 6 and 7, a plate component that is substantially transparent to IR light and at least partially opaque to visible light is preferably placed over or inserted within module 400 to protect its internal components while still providing the required functionality.

FIG. 8 illustrates a compact lens enclosure 806 in accordance with one embodiment. In particular, as one of the goals of the present invention is to provide a lens/mirror assembly that can be deployed in the context of a thin display, the embodiment shown in FIG. 8 is advantageous in that the enclosure 806 for lens 804 is, in at least one dimension, no greater than the diameter of lens 804. Thus, a point 811 on the outer perimeter of lens 804 is substantially flush with the top surface 810 of enclosure 806.

In summary, what has been described are various systems and methods for a compact eye-tracking camera assembly. In accordance with one embodiment, a compact eye-tracking camera assembly is provided for a computing device having a display. The eye-tracking camera assembly includes an infrared image sensor; a lens component; and mirror component. The infrared image sensor, lens component, and mirror component are substantially colinear along a principal axis; and the mirror component is oriented at a compound angle configured to redirect incident IR light along the principal axis, the compound angle characterized by a first angle of approximately 45 degrees relative to a first axis, and a second angle of approximately 15 to 22 degrees relative to a second axis that is orthogonal to the first axis, the first and second axes being substantially parallel to a plane defined by the display.

A tablet computing device in accordance with one embodiment includes an enclosure; a display coupled to enclosure; and an eye-tracking camera assembly incorporated into the display, the eye-tracking camera assembly including: an infrared image sensor; a lens component; and a mirror component. The infrared image sensor, lens component, and mirror component are substantially colinear along a principal axis, and the mirror component is oriented at a compound angle configured to redirect incident IR light along the principal axis, wherein the compound angle is characterized by a first angle of approximately 45 degrees relative to a first axis.

A method of manufacturing a tablet computing device in accordance with one embodiment generally includes providing an enclosure; providing a display; and forming an eye-tracking camera assembly including an infrared image sensor, a lens component, and a mirror component, all of which are substantially colinear along a principal axis. The method further includes interconnecting the enclosure, display, and eye-tracking camera assembly such that such that the mirror component is oriented at a compound angle configured to redirect incident IR light along the principal axis, the compound angle characterized by a first angle of approximately 45 degrees relative to a first axis substantially parallel to a plane defined by the display.

Embodiments of the present disclosure may be described in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices.

In addition, the various functional modules described herein may be implemented entirely or in part using a machine learning or predictive analytics model. In this regard, the phrase "machine learning" model is used without loss of generality to refer to any result of an analysis that is designed to make some form of prediction, such as predicting the state of a response variable, clustering patients, determining association rules, and performing anomaly detection. Thus, for example, the term "machine learning" refers to models that undergo supervised, unsupervised, semi-supervised, and/or reinforcement learning. Such models may perform classification (e.g., binary or multiclass classification), regression, clustering, dimensionality reduction, and/or such tasks. Examples of such models include, without limitation, artificial neural networks (ANN) (such as a recurrent neural networks (RNN) and convolutional neural network (CNN)), decision tree models (such as classification and regression trees (CART)), ensemble learning models (such as boosting, bootstrapped aggregation, gradient boosting machines, and random forests), Bayesian network models (e.g., naive Bayes), principal component analysis (PCA), support vector machines (SVM), clustering models (such as K-nearest-neighbor, K-means, expectation maximization, hierarchical clustering, etc.), linear discriminant analysis models.

Any of the eye-tracking data generated by system 100 may be stored and handled in a secure fashion (i.e., with respect to confidentiality, integrity, and availability). For example, a variety of symmetrical and/or asymmetrical encryption schemes and standards may be employed to securely handle the eye-tracking data at rest (e.g., in system 100) and in motion (e.g., when being transferred between the various modules illustrated above). Without limiting the foregoing, such encryption standards and key-exchange protocols might include Triple Data Encryption Standard (3DES), Advanced Encryption Standard (AES) (such as AES-128, 192, or 256), Rivest-Shamir-Adelman (RSA), Twofish, RC4, RC5, RC6, Transport Layer Security (TLS), Diffie-Hellman key exchange, and Secure Sockets Layer (SSL). In addition, various hashing functions may be used to address integrity concerns associated with the eye-tracking data.

In addition, those skilled in the art will appreciate that embodiments of the present disclosure may be practiced in conjunction with any number of systems, and that the systems described herein are merely exemplary embodiments of the present disclosure. Further, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the terms "module" or "controller" refer to any hardware, software, firmware, electronic control component, processing logic, and/or processor device, individually or in any combination, including without limitation: application specific integrated circuits (ASICs), field-programmable gate-arrays (FPGAs), dedicated neural network devices (e.g., Google Tensor Processing Units), electronic circuits, processors (shared, dedicated, or group) configured to execute one or more software or firmware programs, a combinational logic circuit, and/or other suitable components that provide the described functionality.

As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

The invention claimed is:

1. A compact eye-tracking camera assembly for a computing device having a display, the eye-tracking camera assembly including:
   an infrared image sensor;
   a lens component; and
   a mirror component;
   wherein:
   the infrared image sensor, lens component, and mirror component are substantially collinear along a principal axis; and
   the mirror component is oriented at a compound angle configured to redirect incident IR light along the principal axis, the compound angle characterized by a first angle of approximately 45 degrees relative to a first axis, and a second angle of approximately 15 to 22 degrees relative to a second axis that is orthogonal to the first axis, the first and second axes being substantially parallel to a plane defined by the display;
   a front panel that is substantially transparent to IR light and at least partially opaque to visible light.

2. The compact eye-tracking camera assembly of claim 1, further including a lens barrel configured to support the lens component.

3. The compact eye-tracking camera assembly of claim 1, wherein the lens component is supported by a structure having a first dimension that is less than or equal to the diameter of the lens component.

4. The compact eye-tracking camera assembly of claim 1, wherein the total track length of the image sensor relative to the lens component is approximately 50% greater than the characteristic width of the lens component.

5. The compact eye-tracking camera assembly of claim 4, wherein the lens component has a diameter of approximately 10 mm, and the total track length is approximately 15 mm.

6. A tablet computing device comprising:
   an enclosure;
   a display coupled to enclosure; and
   an eye-tracking camera assembly incorporated into the display, the eye-tracking camera assembly including:
   an infrared image sensor; a lens component; and a mirror component;
   a front panel that is substantially transparent to IR light and at least partially opaque to visible light;
   wherein the infrared image sensor, lens component, and mirror component are substantially collinear along a principal axis; and the mirror component is oriented at a compound angle configured to redirect incident IR light along the principal axis, the compound angle characterized by a first angle of approximately 45 degrees relative to a first axis and a second angle of approximately 15 to 22 degrees relative to a second axis that is orthogonal to the first axis, the first and second axes being substantially parallel to a plane defined by the display.

7. The compact eye-tracking camera assembly of claim 6, further including a lens barrel configured to support the lens component.

8. The compact eye-tracking camera assembly of claim 6, wherein the lens component is supported by a structure having a first dimension that is less than or equal to the diameter of the lens component.

9. The compact eye-tracking camera assembly of claim 6, wherein the total track length of the image sensor relative to the lens component is approximately 50% greater than the characteristic width of the lens component.

10. The compact eye-tracking camera assembly of claim 9, wherein the lens component has a diameter of approximately 10 mm, and the total track length is approximately 15 mm.

11. A method of manufacturing a tablet computing device, the method comprising:
   providing an enclosure;
   providing a display;
   forming an eye-tracking camera assembly including an infrared image sensor, a lens component, a front panel that is substantially transparent to IR light and at least partially opaque to visible light, and a mirror component, all of which are substantially collinear along a principal axis;
   interconnecting the enclosure, display, and eye-tracking camera assembly such that such that the mirror component is oriented at a compound angle configured to redirect incident IR light along the principal axis, the compound angle characterized by a first angle of approximately 45 degrees relative to a first axis substantially parallel to a plane defined by the display, and a second angle of approximately 15-22 degrees relative to a second axis that is orthogonal to the first axis, wherein the second axis is substantially parallel to the plane defined by the display.

12. The method of claim 11, further including supporting the lens component with a lens barrel.

13. The method of claim 11, wherein the total track length of the image sensor relative to the lens component is approximately 50% greater than the characteristic width of the lens component.

14. The method of claim 13, wherein the lens component has a diameter of approximately 10 mm, and the total track length is approximately 15 mm.

* * * * *